(12) United States Patent
Thompson

(10) Patent No.: US 12,073,263 B1
(45) Date of Patent: Aug. 27, 2024

(54) DYNAMIC PROCESSING OF API REQUESTS

(71) Applicant: Amazon Technologies, Inc., Seattle, WA (US)

(72) Inventor: Jonathan Thompson, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 16/698,877

(22) Filed: Nov. 27, 2019

(51) Int. Cl.
| | |
|---|---|
| *G06F 3/01* | (2006.01) |
| *G06F 8/41* | (2018.01) |
| *G06F 9/54* | (2006.01) |
| *G06F 16/901* | (2019.01) |

(52) U.S. Cl.
CPC ............. *G06F 9/54* (2013.01); *G06F 8/433* (2013.01); *G06F 16/9024* (2019.01)

(58) Field of Classification Search
CPC ......... G06F 9/54; G06F 16/9024; G06F 8/433
See application file for complete search history.

(56) References Cited

U.S. PATENT DOCUMENTS

| | | | |
|---|---|---|---|
| 9,424,112 B1 * | 8/2016 | Malamut | G06F 9/541 |
| 10,417,058 B1 * | 9/2019 | Kesler | G06F 16/2453 |
| 2010/0005077 A1 * | 1/2010 | Krishnamurthy | G06F 16/24542 707/E17.136 |
| 2019/0042149 A1 * | 2/2019 | Kesler | G06F 9/30 |

OTHER PUBLICATIONS

Qifa Ke et al. "Optimus: A Dynamic Rewriting Framework for Data-Parallel Execution Plans" (Year: 2013).*
Aditi Pandit et al. "Accelerating Big Data Analytics With Collaborative Planning in Teradata Aster 6" (Year: 2015).*

* cited by examiner

*Primary Examiner* — Timothy A Mudrick
*Assistant Examiner* — Abdou K Seye
(74) *Attorney, Agent, or Firm* — Knobbe, Martens, Olson & Bear, LLP

(57) ABSTRACT

The systems and methods are provided for the dynamic processing of API requests received by an API execution service. The API execution service may map out a dependency graph based on dependency relationships between all the actions involved in processing the API requests, some of which can be determined from the API definitions and configurations. From the dependency graph, an execution plan can be generated that represents a request processing pipeline conveying the optimal order and arrangement to perform the actions (e.g., serially, in parallel). The execution plan can be followed to process API requests and its performance monitored. The API execution service may dynamically modify this execution plan used to process API requests as it becomes apparent that the execution plan is no longer optimal.

20 Claims, 6 Drawing Sheets

DYNAMIC PROCESSING OF API REQUESTS

BACKGROUND

Computing devices can utilize communication networks to exchange data. Companies and organizations operate computer networks that interconnect a number of computing devices to support operations or provide services to third parties. Some of these interconnected computing devices (e.g., hosted computing environments and data processing centers) may be used to host, implement, and execute server-side application programming interfaces (APIs) on behalf of customers, with an API execution environment.

For instance, an API execution environment can receive from users a number of API requests associated with a particular API of a customer, in a format specified by the API. The API execution environment can process and respond to the API requests on behalf of the customer, such as to provide access to data or functionality offered within the API execution environment.

The functionality of an API execution environment can be improved with an execution service that simplifies management and execution of customer APIs. Through an execution service (e.g., a gateway service), a customer may be able to define APIs and configure how they are implemented in the API execution environment. Additionally, the execution service may also be used to handle processing of concurrent API requests in accordance with various APIs.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
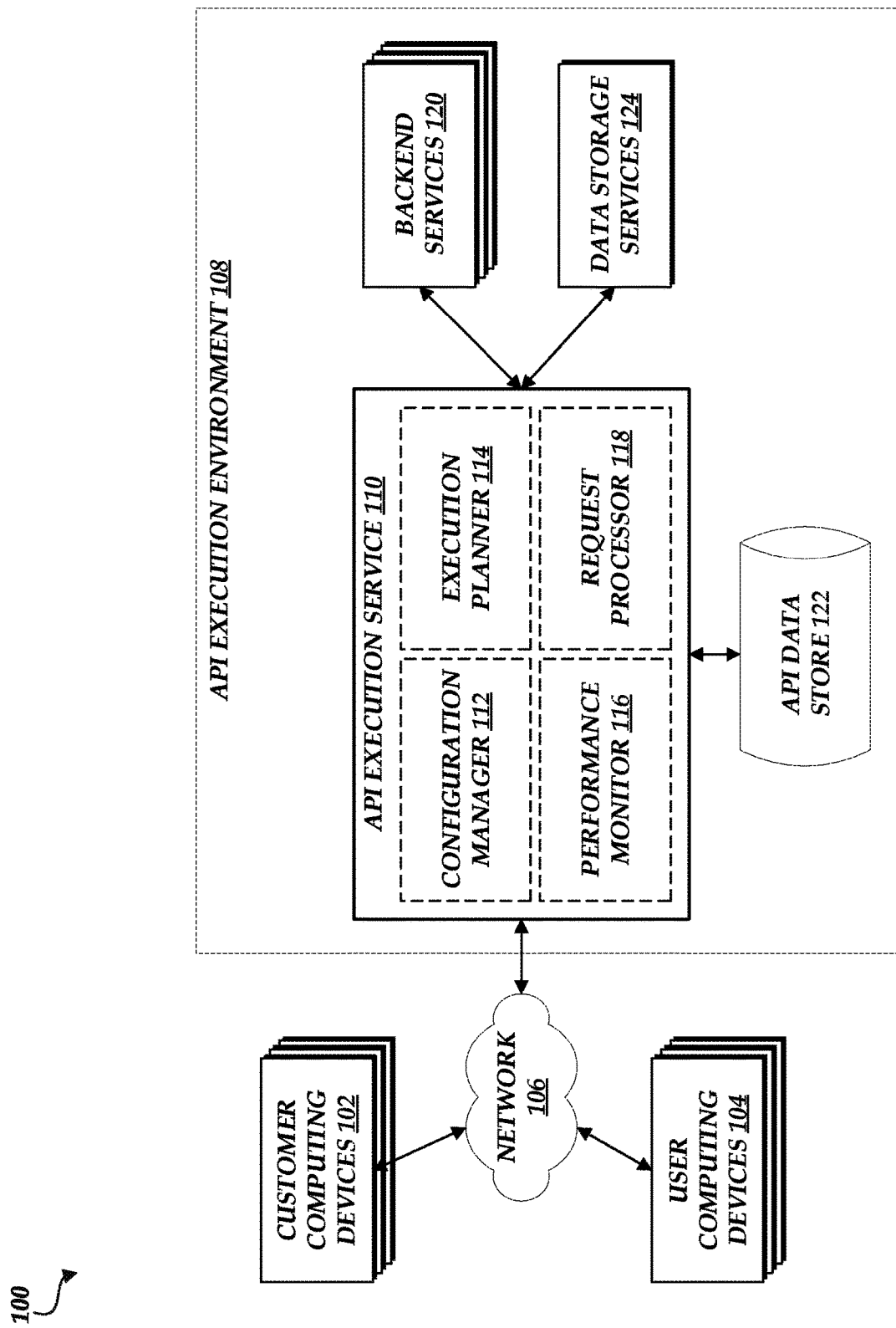
FIG. 1 is a block diagram depicting an illustrative network environment for implementing an API execution environment.

Aspects of the present disclosure relate to systems and methods for the dynamic processing of API requests received by an API execution service in an API execution environment. The API execution service may map out a dependency graph based on the dependency relationships between actions involved in processing a particular type of API request, some of which can be determined from the API definitions and configurations. From the dependency graph, an execution plan can be generated that represents a request processing pipeline conveying the ideal or optimal order and arrangement to perform the actions (e.g., serially, in parallel). The execution plan can be followed to process relevant API requests, and performance of the execution plan and/or its constituent actions can be monitored. The API execution service may dynamically modify this execution plan used to process API requests as it becomes apparent that modification of the execution plan is warranted (e.g., the execution plan is no longer optimal, the execution plan can be improved in some way, and so forth).

The term "API execution environment", as used herein, may refer to execution environments in which responsibility associated with defining, configuring, publishing, implementing server-side APIs is abstracted away from customers and users. For example, a customer need not create an execution environment, install an operating system, or manage a state of the environment in order to process API requests for their API in the environment. In an existing API execution environment, a single execution environment can be responsible for handling many concurrent API requests, across many users and for many APIs. An execution environment, in addition to its ordinary and customary meaning, can refer to a logical unit created on a host computing device (such as a virtual machine instance) that uses the resources available on that device. Each execution environment can provide a degree of isolation from other execution environments. For example, each execution environment may provide a file system isolated from other file systems on the device, and code executing in the execution environment may have limited or no access to other file systems or memory space associated with code executing outside of the execution environment. An example execution environment can be a container within a virtual machine instance.

The systems and methods described herein may improve numerous benefits and advancements in computer technology, such as improved resource utilization and efficiency for the API execution environment, which can translate into reduced resource utilization on behalf of the entity running the API execution environment and/or lower observed latencies for customers of the API execution environment (e.g., for similar amounts of resources allocated). As described herein, the API execution service of the API execution environment can be responsible for handling and processing concurrent API requests that it receives. The API execution service may have knowledge about various actions involved in processing the API requests for a particular API, based on the definitions and configurations associated with the API. The API execution service may be able to leverage this knowledge to map out dependencies between the actions and construct an execution plan with dynamic ordering and speculative execution of the actions associated with processing the API request. The execution plan may orchestrate the processing of the API request and following it can result in improved resource utilization and/or efficiency. This execution plan can be dynamically modified based on new observations and information collected over time about the performance of actions in connection with processing the API request, in order to ensure that the execution plan remains optimal even as conditions within the API execution environment change. Thus, the systems and methods described herein can be an improvement over existing API execution environments.

Turning to FIG. 1, an illustrative network environment 100 is shown in which an API execution environment 108 may host and manage APIs (e.g., endpoints in a request-response message paradigm). The network environment 100 may include customer computing devices 102, user computing devices 104, a network 106, and an API execution environment 108. The API execution environment 108 may include an API execution service 110, backend services 120, an API data store 122, and data storage services 124. The constituents of the API execution environment 108 may be in communication with each other either locally or over the network 106.

While certain constituents of the network environment 100 are depicted as being in communication with one another, in some embodiments, any of the constituents of the network environment 100 can communicate with any other constituent of the network environment 100. For example, the API execution service 110 can communicate with any constituent of the network environment 100; however, not all of these communication lines are depicted in FIG. 1.

The customer computing devices 102 may include any computing device capable of communicating with the API execution environment 108 (more specifically, through the API execution service 110) over the network 106. Examples of such computing devices include a laptop or tablet computer, personal computer, personal digital assistant (PDA), hybrid PDA/mobile phone, mobile phone, and/or a smartphone.

Users of the customer computing devices 102 (e.g., customers) may interact with the API execution environment 108 via the API execution service 110. For instance, a customer may be able to create an API (e.g., author its code and the underlying business/application logic) and provide it to the API execution service 110, which may store that API (including its definitions and configurations) in the API data store 122 of the API execution environment 108. The API execution environment 108 may publish, execute, monitor, and secure the API. Through the API execution service 110, the customer may be able to update the API and configure its execution within the API execution environment 108 (e.g., establish rules or logic defining when and how the API should be executed).

There may be multiple APIs in the API data store 122 that are associated with a particular customer, and there can be multiple customers. The API execution environment 108 may be able to dynamically scale and configure computing capacity (e.g., containers, instances, nodes, etc.) to handle execution of all the APIs of the various customers stored in the API data store 122. The API execution environment 108 may automatically scale up and down this computing capacity (e.g., based on the volume of API requests it receives), which relieves the customers from the burden of having to worry about over-utilization (e.g., having too few computing resources to respond to API requests and suffering performance issues) or under-utilization (e.g., acquiring more computing resources than necessary to respond to API requests, and thus overpaying).

The user computing devices 104 may similarly include any computing device capable of communicating with the API execution environment 108 (more specifically, through the API execution service 110) over the network 106. Examples of such computing devices include a laptop or tablet computer, personal computer, personal digital assistant (PDA), hybrid PDA/mobile phone, mobile phone, and/or a smartphone. Users of the user computing devices 104 may indirectly interact with the API execution environment 108 via the API execution service 110. For instance, a user may operate a web browser or application on a smartphone (e.g., the user computing device), and that web browser or application may send an API request to the API execution service 110 (e.g., to use an API associated with a particular customer).

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The API execution environment 108 and/or its components may be hosted in any suitable execution environment. For instance, in some embodiments, the API execution environment 108 and/or its components may include a network interface, memory, hardware processor(s), and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes to perform operations specified in the program instructions. The memory generally includes RAM, ROM, and/or other persistent and/or auxiliary non-transitory computer-readable storage media. In some embodiments, the API execution environment 108 and/or its components may be implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

The API execution service 110 may be configured to enable a customer to create and configure APIs (e.g., to be stored in the API data store 122) that are implemented within the API execution environment 108 and can leverage features within the API execution environment 108, such as the backend services 120 and data storage services 124. A customer may be able to publish and deploy their APIs through the API execution service 110, which can manage and handle the processing associated with those APIs (e.g., processing received API requests associated with those APIs). The API execution service 110 may be additionally configured to enable a customer to maintain, monitor, and secure their APIs within the API execution environment 108. Thus, users of the user computing devices 104 may run applications that are integrated with a customer API that is managed by the API execution service 110 and implemented within the API execution environment 108, and the applications can send API requests to the API execution service 110 in order to obtain access to business logic, data (e.g., stored through data storage services 124), functionality (e.g., from the backend services 120), and so forth, as defined and permitted by the API.

The API execution service 110 may also be configured to handle all the computing tasks involved in receiving, processing, and responding to API requests. There may be any number of API requests—from any number of user computing devices 104, for any of the APIs in the API data store 122, and associated with any customer (e.g., a customer may be associated with multiple APIs in the API data store 122). In practical terms, the API execution service 110 may be handling all the computing tasks associated with hundreds of thousands of concurrent API requests, including traffic management, authorization and access control, monitoring, and version management.

In various embodiments, the traffic and operations of the API execution service 110 and the API execution environment 108 may be broadly subdivided into two categories: control plane operations carried over a logical control plane and data plane operations carried over a logical data plane. The control plane may represent the movement of control signals through the API execution service 110 or the API execution environment 108. The control plane generally includes one or more control plane components distributed across and implemented by one or more control servers. Control plane traffic generally includes administrative operations, such as management of API definitions and configurations or general systems configuration and management (e.g., resource placement, hardware capacity management, diagnostic monitoring, system state information, and so forth). In contrast, the data plane may represent the movement and processing of user data through the API execution service 110 or the API execution environment 108 (e.g., in connection to a received API request). The data plane includes user data or user functionality implemented in the API execution environment 108 (e.g., files or data stored through the data storage services 124, functionality provided by the backend services 120, and so forth). Data plane traffic generally includes non-administrative operations such as transferring user data to and from data storage services 124 or backend services 120. The control plane components are typically implemented on a separate set of servers from the data plane servers, and control plane traffic and data plane traffic may be sent over separate/distinct networks. Often, control plane operations are time-insensitive (e.g., creating and configuring an API), while data plane operations are time sensitive (e.g., handling and processing an API request for the created/configured API).

In some embodiments, the API execution service 110 may include configuration manager 112, an execution planner 114, a performance monitor 116, and a request processor 118. These components of the API execution service 110 may perform some of the functions of the API execution service 110. However, in some cases, these components may not be actual components of the API execution service 110 and instead may be abstractions that help to facilitate understanding of the different types of functions performed by the API execution service 110. In some embodiments, the configuration manager 112 and the performance monitor 116 may be associated with the control plane of the API execution service 110, and the execution planner 114 and the request processor 118 may be associated with the data plane of the API execution service 110.

In some embodiments, the configuration manager 112 of the API execution service 110 may be configured to manage the API definitions and configurations associated with a customer API (e.g., one of the APIs stored in the API data store 122) implemented within the API execution environment 108. Through the configuration manager 112, the customer may be able to define an API, set configuration settings for the API (e.g., for how API requests are processed), and change the definitions or configuration settings for their API. Thus, the customer may be able to define how a particular type of API request for the API is to be handled and processed, including the features to invoke and/or the actions to be performed (e.g., call a backend service A and call a backend service C). In some embodiments, the definitions and configurations for an API that a customer provides to the configuration manager 112 may be saved to the API execution environment 108 (e.g., added to the API data store 122 or stored through the data storage services 124).

In some embodiments, the execution planner 114 of the API execution service 110 may be configured to plan the processing and execution of received API requests for an API. More specifically, the execution planner 114 may determine a set of actions associated with processing various types of API requests for an API and generate a dependency graph that maps out the dependencies among the set of actions. The dependency graph for an API may be generated based on any information available to the API execution service 110, including information for the API that has been provided to the configuration manager 112 (e.g., by the customer). The dependency graph may include internal actions and/or external actions. Internal actions may include actions that are commonly performed by the API execution service 110 (e.g., for many different APIs). External actions may include actions that are specific to the API and used to execute the business logic or application logic that the customer defined in the API (e.g., backend logic). Thus, the generated dependency graph for an API may include actions that are specified for the API (e.g., based on information provided to the API execution service 110 by the customer, such as information in the API definitions or configuration). In some embodiments, a dependency graph may be generated for each type of API request associated with an API, and each dependency graph may map out the dependency relationships associated with the actions for processing a particular type of API request. The execution planner 114 may also be configured to generate one or more execution plans for processing the various types of API requests associated with the API. An execution plan may provide an optimal structure or arrangement for a request processing pipeline for processing a type of received API request. As used herein, optimal can refer to whether or not the thing being discussed achieves one or more goals (e.g., latency, resource usage, efficiency, etc.). Such goals can be defined by, for example, the customer or a provider of the API execution service. The execution plan may generated from the dependency graph, which means that the execution plan may initially mirror the dependency graph. However, the execution planner 114 may dynamically modify an execution plan over time as new information arises (e.g., from the performance monitor 116) that indicates how the execution plan can be adjusted to improve computing resource usage and efficiency. The execution planner 114 may be configured (e.g., via a set of logic or policies) to evaluate any new information provided to it, determine if an execution plan should be modified on the basis of the new information, and determine how the execution plan should be modified.

In some embodiments, the request processor 118 of the API execution service 110 may be configured to handle the actual processing and execution of a received API request. The request processor 118 may follow an execution plan generated and provided by the execution planner 114 in order to process a received API request. For instance, the request processor 118 may perform the actions in the execution plan in the arrangement and order that is specified in the execution plan. In some embodiments, the actions in an execution plan may be performed by different computing components or nodes, and the request processor 118 may orchestrate the performance of the actions by assigning each action in the execution plan to a different component or node.

In some embodiments, the performance monitor 116 of the API execution service 110 may be configured to monitor the performance of actions associated with an execution plan and/or an API. For example, the performance monitor 116 can monitor each component or node performing an action in the execution plan. The performance monitor 116 may collect this performance data over a time period and provide it to the execution planner 114, which can evaluate the performance data in order to determine if the execution plan should be modified and how the execution plan should be modified.

Within the API execution environment 108, the backend services 120 may include, for example, billing or logging services, cloud computing services, and data storage services. The API execution service 110 may enable transmission of data, such as service calls, to the backend services 120 for processing a received API request. For example, in order to process an API request received from a user computing device, the API execution service 110 may transmit an API request to one of the backend services (e.g., to retrieve data to be included in a response to the API request).

The API data store 122 may be used to store any or all of the information associated with the customer APIs that are implemented within the API execution service 110 (but not user-specific data, such as data specific to users that can be returned in a response to an API request). For instance, for a particular API, the API data store 122 may include the definitions and configurations for the API, any dependency graphs that are generated for the API, and any execution plans that are generated for the API. In some embodiments, the API data store 122 may store the control instructions associated with an API. The control instructions may include the API definitions (including implementation details for the API, such as the various types of API requests and their formats, the processing for each type of API request, and the responses to various types of API requests and their formats, any functionality or interactions with various backend services 120 or data storage services) and API configurations, which may specify (or may be used to determine) the set of actions or functionality that are to be performed in processing the various API requests for a particular API. As used in this context, type of API request can refer to a specific method, or similar logical sub-component, of an API, that is exposed by the API. Thus, the control instructions for an API may indicate (either directly or indirectly) the entire set of actions or functionality that can be performed in processing the various API requests received by the API execution service 110 for a particular API, and/or a set of actions for processing a particular type of API request. In some cases, the API configurations may include customer-provided settings or preferences specifying how certain actions are to be performed (e.g., in series or in parallel) by the API execution service 110. In some embodiments, the API data store 122 may be a database, such as a relational or non-relational database.

The network-based data storage services 124 may be configured to enable the API execution environment 108 to store and retrieve data from one or more persistent, or substantially persistent, data sources. The API execution environment 108 may store and retrieve data from the data sources in connection with an API stored in the API data store 122. For example, the API execution service 110 may receive an API request (e.g., from a user computing device), retrieve data from a data source via the data storage services 124, and return an API response that includes the retrieved data. Additionally, the data storage services 124 may enable the API execution service 110 to store and retrieve information associated with an API from the API data store 122 (such as code, configurations, or metadata), store and retrieve information representing the dependencies between actions for an API from the API data store 122 (e.g., dependency graphs), store and retrieve data regarding execution of API requests (e.g., metrics or logs) for an API from the API data store 122, and also store and retrieve data used in execution of API requests (e.g., data returned in an API response).

The network-based data storage services 124 may represent, for example, a relational or non-relational database. In another example, the network-based data storage services 124 may represent a network-attached storage (NAS), configured to provide access to data arranged as a file system. The network-based data storage services 124 may further enable the API execution service 110 to query for and retrieve information regarding data within the API execution environment 108, such as by querying for a number of relevant files or records, sizes of those files or records, file or record names, file or record creation times, etc. In some instances, the network-based data storage services 124 may provide additional functionality, such as the ability to separate data into logical groups (e.g., groups associated with individual customers, etc.). While shown as distinct from the backend services 120, the network-based data storage services 124 may in some instances also represent a type of backend service 120.

The network-based data storage services 124 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage. An example data store can include a table in DynamoDB™, a distributed NoSQL database.

Figure 2:
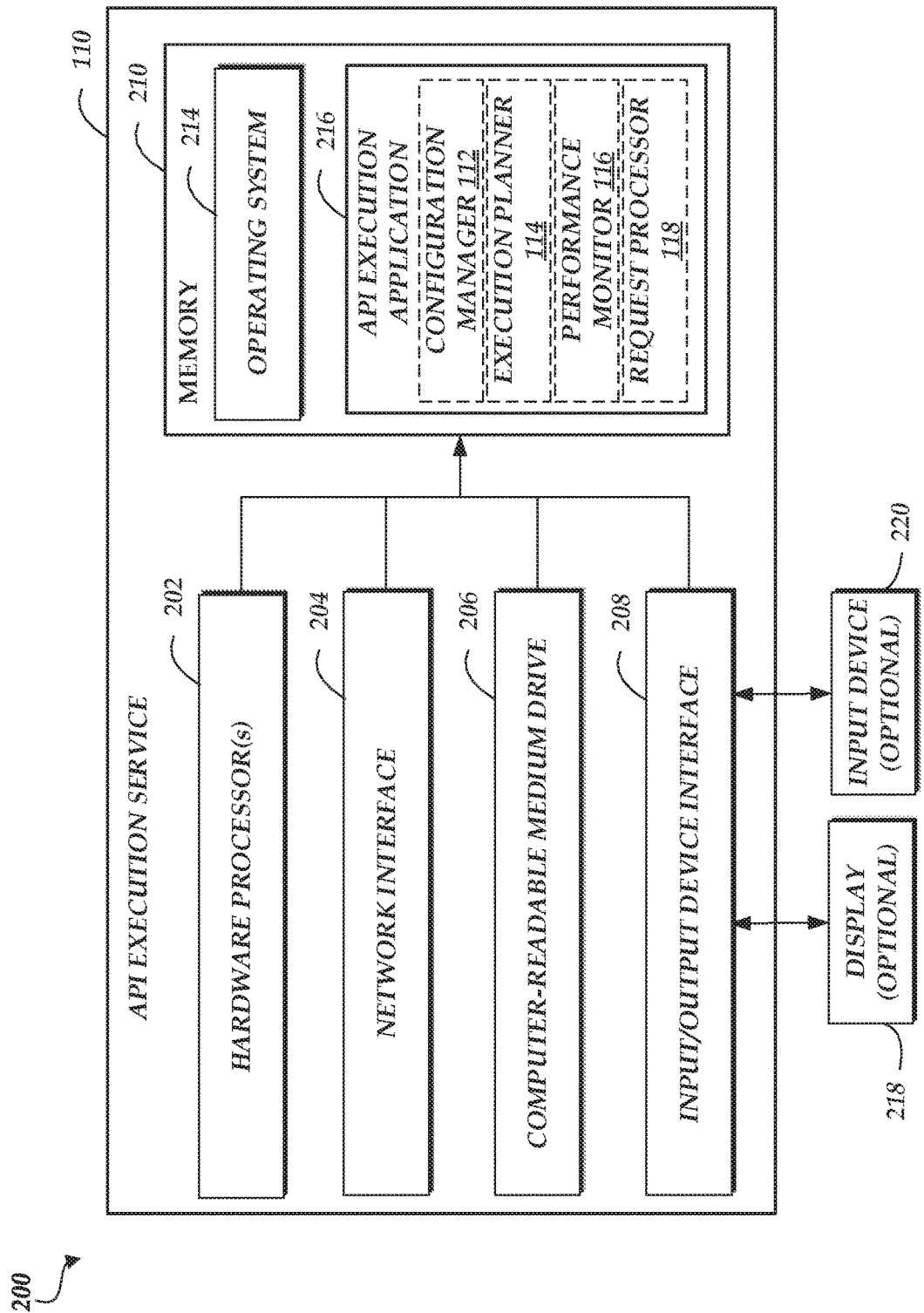
FIG. 2 is a schematic diagram of an API execution service of the API execution environment depicted in FIG. 1.

FIG. 2 is a schematic diagram of an API execution service 110 of the API execution environment 108 depicted in FIG. 1. This schematic diagram of the API execution service 110 includes an arrangement of computer hardware and software components that may be used to manage (e.g., create, publish, maintain, monitor, and secure) and implement APIs within an API execution environment 108. While the general architecture of the API execution service 110 is shown and described with respect to FIG. 2, the general architecture of FIG. 2 can be used to implement other services and/or applications described herein. Those skilled in the art will appreciate that the API execution service 110 may include more (or fewer) components than those shown in FIG. 2. Further, other computing systems described herein may include similar implementation arrangements of computer hardware and software components.

As depicted in FIG. 2, the API execution service 110 may include one or more hardware processors 202, a network interface 204, a non-transitory computer-readable medium drive 206, and an input/output device interface 208, all of which may communicate with one another by way of a communication bus. As illustrated, the API execution service 110 is associated with, or in communication with, an optional display 218 and an optional input device 220. In other embodiments, the display 218 and input device 220 may be included in the user computing devices 104 shown in FIG. 1. The network interface 204 may provide the API execution service 110 with connectivity to one or more networks or computing systems. The hardware processor 202 may thus receive information and instructions from other computing systems (such as the customer computing devices 102 or the user computing devices 104) or services via the network 104. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 generally includes RAM, ROM and/or other persistent or non-transitory computer-readable storage media. The memory 210 may store an operating system 214 that provides computer program instructions for use by the processing unit 202 in the general administration and operation of the API execution service 110. The memory 210 may further include other information for implementing aspects of the API execution service 110. The memory 210 may contain specifically configured computer program instructions that the hardware processor 202 executes in order to implement one or more embodiments of the API execution service 110, such as an API execution application 216 that may be executed by the hardware processor 202. In some embodiments, the API execution application 216 may be software to implement various aspects of the present disclosure. For example, the API execution application 216 may enable API requests to be received and processed based on a generated execution plan that can be dynamically modified to optimize computer resource usage. In some embodiments, the API execution application 216 may be used to operate the various components of the API execution service 110 depicted in FIG. 1 (or use to implement the functionality associated with those components), which may include a configuration manager 112, the execution planner 114, the performance monitor 116, and the request processor 118. For instance, the API execution application 216 may include software instructions that are executed by the one or more hardware processors 202 in order to manage the definitions and configurations of APIs (e.g., the functionality of the configuration manager 112), plan and manage the efficient processing of received API requests (e.g., the functionality of the execution planner 114), monitor the performance of actions in the processing of API requests (e.g., the functionality of the performance monitor 116), and handle the actual processing and execution of a received API request in accordance with an execution plan (e.g., the functionality of the request processor 118).

Figure 3A:
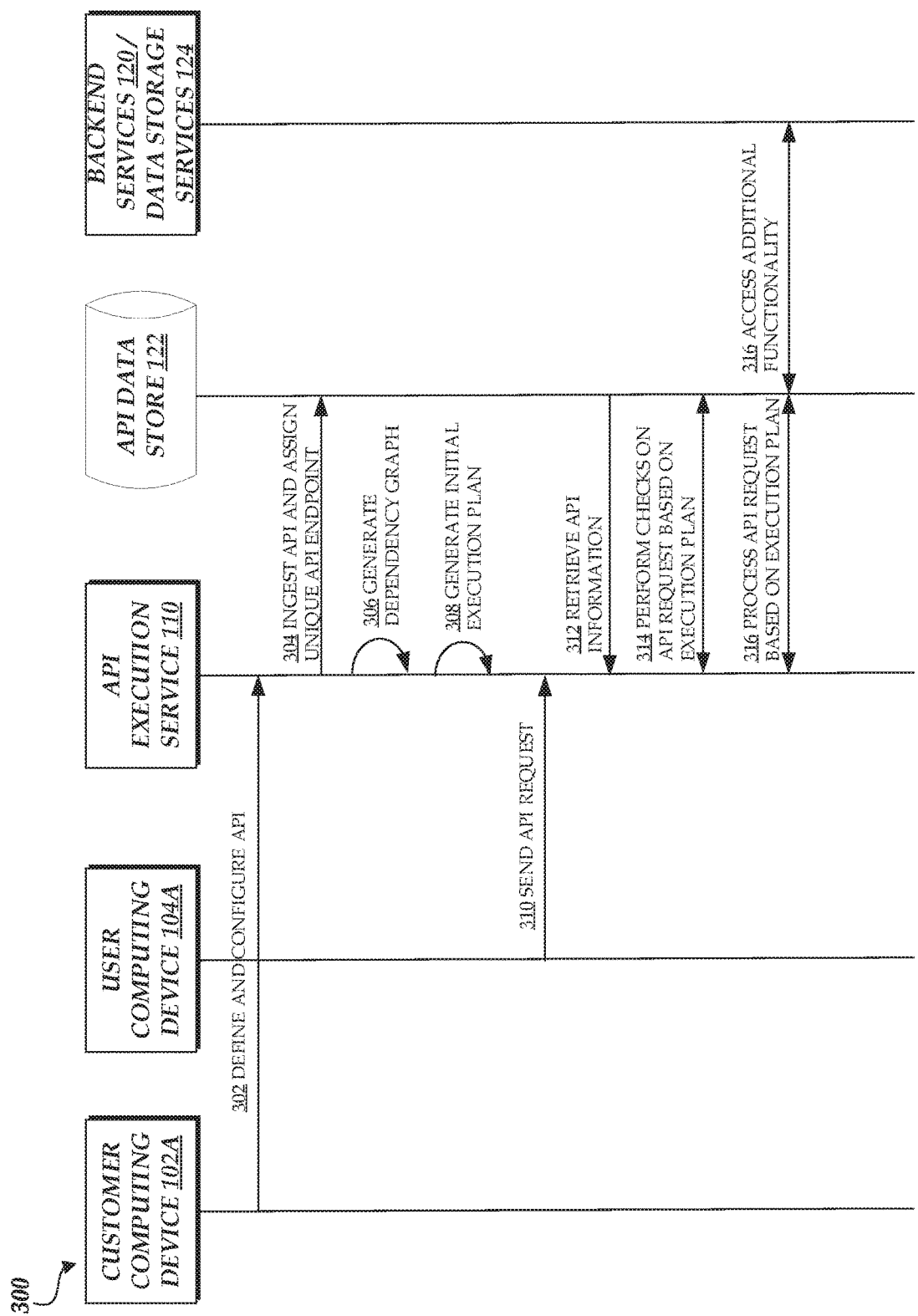
FIGS. 3A-3B are flow diagrams depicting illustrative interactions for the dynamic processing of API requests.
Figure 3B:
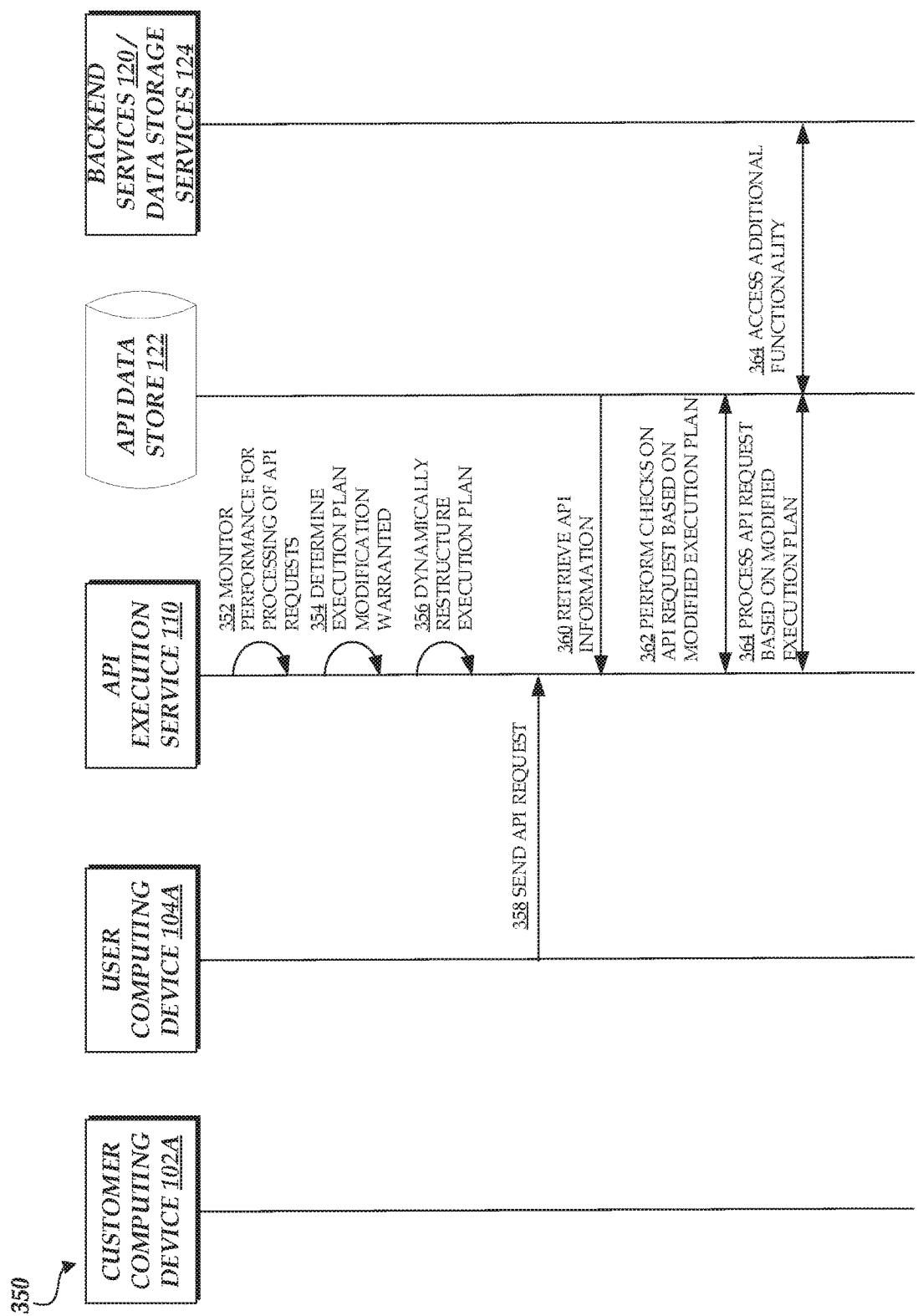

FIGS. 3A-3B are flow diagrams depicting illustrative interactions for the dynamic processing of API requests (e.g., within an API execution environment such as the API execution environment 108). More specifically, the flow diagram 300 in FIG. 3A depicts the interactions for an example scenario that is likely to develop in a time period immediately after the API execution service 110 ingests an API and begins to receive and process API requests from user computing devices. In contrast, the flow diagram 350 in FIG. 3B depicts the interactions for an example scenario that is likely to develop after the API execution service 110 has gathered enough data (e.g., from monitoring the processing of API requests) to determine that an execution plan for processing API requests needs to be modified.

The environment in which the interactions of FIGS. 3A-3B are performed may be similar to the network environment 100 of FIG. 1. For instance, the customer computing device 102A of FIGS. 3A-3B can be one of the customer computing devices 102 of FIG. 1, and the user computing device 104A of FIGS. 3A-3B can be one of the user computing devices 104 of FIG. 1. The depicted interactions in FIGS. 3A-3B are example interactions. Other interactions (not illustrated) may be possible in accordance with the present disclosure in other embodiments.

With respect to the flow diagram 300 of FIG. 3A, at step 302, a customer using a customer computing device 102A may author and define an API with the API execution service 110, such as by submitting the API via a GUI or API. The customer may additionally configure the API with the API execution service 110, such as via a GUI or API. In some embodiments, the API may be defined and configured through a configuration manager, such as configuration manager 112 of FIG. 1. In the API definitions and configurations, the customer may define and specify implementation details for their API, such as the various types of API requests and their formats, the processing for each type of API request, and the responses to various types of API requests and their formats. The implementation details may also include any functionality or interactions with various backend services 120 or data storage services 124.

At step 304, the API execution service 110 may ingest the API (e.g., the API definitions and configurations) and save it to the API data store 122 managed by the API execution environment 108. In some embodiments, the API may be saved through the data storage services 124. The API execution service 110 may assign the API a unique API endpoint (e.g., unique identifier) and associated it with the stored API definitions and configurations. Thus, a customer may be associated with numerous APIs in the API execution environment 108, each of which has its own unique identifier. This unique identifier can be used to look up the definitions and configurations for an API (e.g., in order to properly process a received API request).

At step 306, the API execution service 110 may generate a dependency graph based on all the actions involved in processing a particular type of API request. More specifically, there may be a set of actions or functionality that are performed in processing the specific type of API request received by the API execution service for a particular API. An action may be dependent on one or more other actions, such as if that action requires the use of data that is output by the one or more other actions, or if performance of that action cannot be initiated until the one or more other actions have been performed. An API may be associated with numerous types of API requests, and a dependency graph may be generated for each type of API request based on the actions involved in processing that particular type of API request. In some embodiments, the API execution service 110 may automatically generate the one or more dependency graphs that are associated with an API. A dependency graph for an API may be generated based on any information available to the API execution service 110, including information for the API that has been provided to the API execution service 110 (e.g., by the customer). The dependency graph may include internal actions (e.g., actions commonly performed by the API execution service 110 for many different APIs, usually associated with features offered by the API execution service 110, such as checks on API requests) and external actions (e.g., actions that are specific to the API and used to execute the business logic or application logic that the customer defined in the API, such as, e.g., backend logic).

With regards to the internal actions that are associated with features (e.g., middleware capabilities) offered by the API execution service 110, the API execution service 110 may have an inherent understanding of the dependencies and requirements (e.g., prerequisites) of the internal actions. Any cross-dependencies for these internal actions may be mapped out beforehand and the API execution service 110 may be able to easily determine which internal actions can be performed in parallel and how the internal actions should be arranged for processing relative to all the other actions in the dependency graph. In some embodiments, the dependency graph may include internal actions for the API execution service 110 to perform a throttling check, an authentication check, an authorization check, and a request validation check, and each of these checks may be performed in parallel.

For a throttling check, the API execution service 110 may impose limits on how often a particular API or a set of APIs (e.g., associated with a customer) can be called or requested by user computing devices. Thus, the API execution service 110 may check to see if the API associated with a received API request should be throttled or not. If the throttling check reveals that the API is throttled, then the API execution service 110 may stop processing the API request. In some embodiments, the API execution service 110 may communicate with a remote system in order to perform the throttling check.

For an authentication check, the API execution service 110 may check the information contained in the API request to authenticate the identification of the user submitting the request. In some cases, the user may be a person and/or an entity that is interested in using the API. If the authentication fails, then the API execution service may stop processing the API request and send a notification to the user computing device that sent the API request and/or the customer associated with the API. In some embodiments, the API execution service 110 may communicate with a remote system in order to perform the authentication check.

For an authorization check, the API execution service 110 may check to ensure that the user and/or the user computing device 104A submitting the API request have the proper authorization and/or security clearance needed for the API request. If the authorization check reveals that there is no authorization, then the API execution service 110 may stop processing the API request and send a notification to the user computing device that sent the API request and/or the customer associated with the API.

For a request validation check, the API execution service 110 may check to see if the API request is in a valid format (e.g., it conforms to the API definitions). In other words, the API execution service 110 may validate that the format of the API request matches the description of what the API execution service 110 is expecting (e.g., based on the API definitions). If the request validation check fails, then the API execution service 110 may stop processing the API request and send a notification to the user computing device that sent the API request and/or the customer associated with the API.

With regards to the external actions that are specific to the API and used to execute the business logic or application logic that the customer defined in the API (e.g., backend logic), the API execution service 110 may determine the dependencies and requirements (e.g., prerequisites) associated with each of the external actions. The API execution service 110 may be configured to map out the dependencies and requirements for the external actions based on information available to the API execution service 110, including information, hints, or implementation details that were provided by the customer (e.g., in the API definitions and configurations). For instance, the API definitions may indicate that actions A, B, C, D, and E need to be performed to satisfy a particular type of API request. The actions A, B, C, D, and E may provide hints that enable the API execution service 110 to determine the dependencies and requirements between those actions, and the API execution service 110 can use those relationships to arrange the actions in the dependency graph to be performed in either serial or parallel fashion without needing the customer to explicitly specify which actions are to be performed in serial or parallel.

The API execution service 110 may also identify any dependency relationships that may exist between the internal actions and the external actions involved in processing a type of API request for a particular API. The API execution service 110 may use the mapped out relationships between all the actions involved in processing that type of API request for the API to generate a dependency graph, which will convey all the dependency relationships between the actions. The dependency graph, with its dependency relationships, may be useful in determining which actions can be performed in a serial or parallel manner. Thus, the dependency graph can be useful for determining an optimal arrangement or structure (e.g., for efficient computing resource usage, reduced latency, etc.) for a request processing pipeline used to perform the actions. In some embodiments, the API gateway 110 may associate this dependency graph with the particular API and save the dependency graph, either within the API execution service 110 (e.g., in a data storage of the API execution service 110, not shown), with the API definitions and configurations (e.g., in the API data store 122), or using the data storage services 124. If there are multiple dependency graphs (e.g., corresponding to the various different types of API requests), all of those dependency graphs may be associated with the API and saved.

At step 308, the API execution service 110 may generate an initial execution plan for processing a particular type of API request. In some embodiments, the execution plan may provide an ideal or optimal (e.g., in terms of computing resource usage, efficiency, latency, etc.) structure or arrangement for a request processing pipeline for processing a particular type of API request, and the execution plan may convey which actions are to be performed serially or in parallel. The execution plan may include both internal actions and external actions, which may allow the internal actions performed by the API execution service 110 to be performed as efficiently as possible, while also allowing the API execution service 110 to execute the customer's intent (e.g., external actions from API definitions) in a manner that achieves certain latency goals (e.g., from the perspective of the user computing device) and the computing resource utilization of the API execution service 110 achieves certain resource usage goals. The arrangement of actions in the execution plan may factor in information from the API definitions or configurations. For instance, actions that are not dependent on other actions can be performed in parallel to reduce latency, at the cost of additional computing resources. In contrast, actions that have dependencies may be performed after waiting for the prerequisite actions to be completed. In some embodiments, this initial execution plan may specify an initial arrangement for the request processing pipeline for performing the set of actions involved in processing a particular type of API request.

In some embodiments, the initial execution plan for processing a particular type of API request may be generated from the dependency graph associated with that particular type of API request, which means that the execution plan may initially mirror the corresponding dependency graph. Although FIG. 3A is depicted based on the scenario of a single initial execution plan, it should be noted that if there are multiple types of API requests associated with an API, each type of API request can have an associated dependency graph, as such multiple initial execution plans (each corresponding to a dependency graph and API request type) will be generated at this step. Furthermore, it should be noted that, as in the example scenario depicted in FIG. 3B, an initial execution plan may be dynamically modified over time as new information arises that indicates how the execution plan can be adjusted to improve computing resource usage and efficiency. In some embodiments, the API gateway 110 may associate a generated execution plan with the API (e.g., for processing a particular type of API request) and save the execution plan, either within the API execution service 110 (e.g., in a data storage of the API execution service 110), with the API definitions and configurations in the API data store 122, or using the data storage services 124. In some embodiments (not shown), generation of the execution plan may occur after an API request is received by the API execution service 110 (e.g., after step 310, but prior to step 314).

At step 310, a user computing device 104A may send an API request to the API execution service 110. The API request may contain information identifying the API that was ingested (e.g., the unique identifier or unique API endpoint assigned to the API).

At step 312, the API execution service 110 may retrieve certain information associated with the API, which may include the API definitions and configurations associated with the API, and API execution service 110 may retrieve this information based on the contents of the received API request, such as by using the unique identifier or unique API endpoint in the API request. That information can be used to retrieve the relevant information from the API data store 122. The API execution service 110 may also retrieve the execution plan that is associated with the particular type of the API request. For instance, the API execution service 110 can check the API definitions/configurations to determine the type for the received API request, look up the execution plans associated with the API, and then identify the execution plan for processing API requests of that particular type.

At step 314, the API execution service 110 may follow the execution plan in order to perform the internal actions specified in the execution plan (e.g., a series of checks on the API request). If all the checks on the API request are successful, then at step 316, the API execution service 110 may follow the execution plan in order to perform the external actions specified in the execution plan (e.g., processing the API request in accordance with the customer's intent). In some cases, the defined execution of the API request may involve accessing additionally functionality provided by the backend services 120 and/or the data storage services 124 and the API execution service 110 may orchestrate any calls or requests made to the backend services 120 and/or the data storage services 124 for processing the API request. In the flow chart 300 shown in FIG. 3A, step 316 for processing API request based on the execution plan (between API execution service 110 and the API data store 122) is shown to include the accessing of additional functionality (between API data store 122 and the backend services 120/data storage services 124), however it should be understood that processing the API request may involve any of the components selected among the API execution service 110, the API data store 122, the backend services 120/data storage services 124, and even the user computing device 104A. For instance, in order to process an API request, the API execution service 110 may not need to access the API data store 122 and may instead interact with the backend services 120/data storage services 124, before sending a response to the user computing device 104A.

After processing this API request (e.g., received at step 310), the API execution service 110 may continue to follow the initially generated execution plan (e.g., from step 312) to process any additional API requests that the execution plan can be applied to (e.g., API requests of the same type). However, as described in regards to FIG. 3B, the implemented execution plan may not remain static.

With respect to the flow diagram 350 of FIG. 3B, the API may already been defined, configured, and ingested. There may be an execution plan that is already in place for processing a particular type of API request for the API, and numerous API requests may have been processed in accordance with the execution plan.

At step 352, the API execution service 110 may continually, or periodically, monitor the computing performance (e.g., via the performance monitor 116) associated with the processing of API requests for the API (e.g., in general, or in connection with a particular execution plan). More specifically, the API execution service 110 may monitor the performance of all actions (both internal and external actions) in connection with this API and/or separately monitor the performance of actions for each execution plan associated with this API. The API execution service 110 may continue to collect new information associated with the performance of the actions and flag any actionable signals that may indicate that the execution plan is no longer optimal, or warrants modification. In other words, the API execution service 110 may observe the behavior and outcomes associated with the actions in order to evaluate how "expensive" the actions are (in terms of computing resource usage, efficiency, and/or latency). For example, the API execution service 110 may observe the performance of action A and action B in the processing of API requests. Action A and action B may have no cross-dependency, and the execution plan may have action A and action B running in parallel. However, the API execution service 110 may observe that when processing API requests based on this execution plan, action A frequently fails. The failure of action A ends processing for an API request, which means any computing resources that were invested in performing action B are wasted.

In some embodiments, the API execution service 110 may have a configurable set of logic or policies used to determine an actionable signal from among the data collected in the course of monitoring action performance. For instance, there can be triggers or definitions associated with an action failing and/or triggers or definitions associated with an action failing with sufficient frequency to be an actionable signal (e.g., a threshold limit of failure). For example, an action that fails more than ten percent of the time (e.g., fails in the course of processing more than ten percent of API requests) may be a sufficient level of failure to be an actionable signal. Or an action that fails more than X times within a Y period of time, may be a sufficient level of failure to be an actionable signal.

At step 354, the API execution service 110 may determine whether modification of an execution plan is warranted. There may be many factors that the API execution service 110 may take into consideration for making this determination, which in some cases can be customer-defined in a set of logic or policies. For example, the API execution service 110 may assess if there are potential improvements that can be made to the execution plan in place, and if the resulting improvements would provide a greater benefit than the cost (e.g., in terms of computing resource utilization) associated with implementing the improvements. As an even more specific example, the API execution service 110 may assess the resulting improvement from a different arrangement for the execution plan, such as based on a quantitative metric (e.g., the reduction in execution time or computing resource utilization observed when processing the API request under the improved execution plan), and compare it to any costs associated with the change (e.g., the computing resource utilization required to actually change the execution plan). In some embodiments, the API execution service 110 may determine if the execution plan is no longer ideal or optimal (e.g., it is inefficient with regard to computing resource usage). In any case, the API execution service 110 may make its determination using new information (e.g., information not considered during the generation of the existing execution plan) that is now available to the API execution service 110, such as the data from monitoring the performance of actions. The API execution service 110 may also weigh and consider the costs associated with modifying the execution plan. For instance, the API execution service 110 may determine that it costs more resources to modify the execution plan than leave it as it is, or alternatively, the API execution service 110 may decide that it is relatively expensive (in terms of resources) to perform action B and a lower threshold of failures of action A is needed in order to warrant changing the execution plan (e.g., because the loss of resources invested into action B in connection to all the failures of action A is too costly and impactful to the API execution service). Thus, the API execution service 110 may be configured with the ability to determine actionable signals for modifying the execution plan (e.g., when, what, and the magnitude needed), which can be defined in variables in a set of logic or policies. These variables can be determined based on the observed behavior and performance of the actions, and they may take into account the relative expense between the actions performed.

Upon determining that modification of the execution plan is warranted, at step 356, the API execution service 110 can make dynamic adjustments to the execution plan based on the new information now available to the API execution service 110 (e.g., the information used to determine that the execution plan is not optimal). For example, the API execution service 110 may dynamically reorder the actions performed in the execution plan, arrange actions in parallel to be performed serially, and so forth. The API execution service 110 may make these modifications in accordance with a set of logic or policies that dictate how modifications should be made in various circumstances (e.g., once an action performed in parallel reaches a threshold limit of failure, it should be pulled out of parallel execution and inserted in front of execution of other actions). This modified execution plan, which should be an improvement over (e.g., more efficient than, resulting in reduced processing time or computing resource usage) the previous execution plan, can then be used in lieu of the previous execution plan for processing API requests going forward. Thus, the API execution service 110 may be configured to modify the execution plan based on what is happening dynamically with the performance of the actions in the execution plan; the API execution service 110 is obtaining additional information, signals, and understanding that enables the API execution service 110 to restructure the request processing pipeline of the execution plan in a way that yields better computing performance and resource efficiency.

In some embodiments, the API gateway 110 may associate the modified execution plan with the API (e.g., for processing a particular type of API request) and save the modified execution plan, either within the API execution service 110 (e.g., in a data storage of the API execution service 110), with the API definitions and configurations in the API data store 122, or using the data storage services 124.

At step 358, a user computing device 104A operated by a user may send an API request to the API execution service 110. The API request may contain information identifying the API that was ingested (e.g., the unique identifier or unique API endpoint assigned to the API).

At step 360, the API execution service 110 may retrieve information associated with the API, which may include the API definitions and configurations, the dependency graph associated with the API, and/or the execution plan associated with the API for processing the API request. The API execution service 110 may retrieve this information based on the contents of the API request, such as by using the unique identifier or unique API endpoint in the API request. The execution plan may continue to be dynamically modified over time as new information arises that indicates how the execution plan can be adjusted to improve computing resource usage and efficiency, and at step 360, the most-current execution plan will be retrieved. In this scenario, the information retrieved by the API execution service 110 will at least include the modified execution plan (e.g., generated at step 356) that is now considered optimal for processing the API request.

At step 362, the API execution service 110 may follow the modified execution plan in order to perform the internal actions specified in the modified execution plan (e.g., a series of checks on the API request). If all the checks on the API request are successful, then at step 364, the API execution service 110 may follow the modified execution plan in order to perform the external actions specified in the modified execution plan (e.g., processing the API request in accordance with the customer's intent). In some cases, the processing of the API request may involve accessing additionally functionality provided by the backend services 120 and/or the data storage services 124, and the API execution service 110 may orchestrate any calls or requests made to the backend services 120 and/or the data storage services 124 for processing the API request. In the flow chart 350 shown in FIG. 3B, step 364 for processing API request based on the modified execution plan (between API execution service 110 and the API data store 122) is shown to include the accessing of additional functionality (between API data store 122 and the backend services 120/data storage services 124), however it should be understood that processing the API request may involve any of the components selected among the API execution service 110, the API data store 122, the backend services 120/data storage services 124, and even the user computing device 104A. For instance, in order to process an API request, the API execution service 110 may not need to access the API data store 122 and may instead interact with the backend services 120/data storage services 124, before sending a response to the user computing device 104A. After processing the API request (e.g., received at step 358), the API execution service 110 may then continue to follow the modified execution plan (e.g., generated from step 356) to process any additional API requests that the modified execution plan can be applied to (e.g., API requests of the same type).

Figure 4:
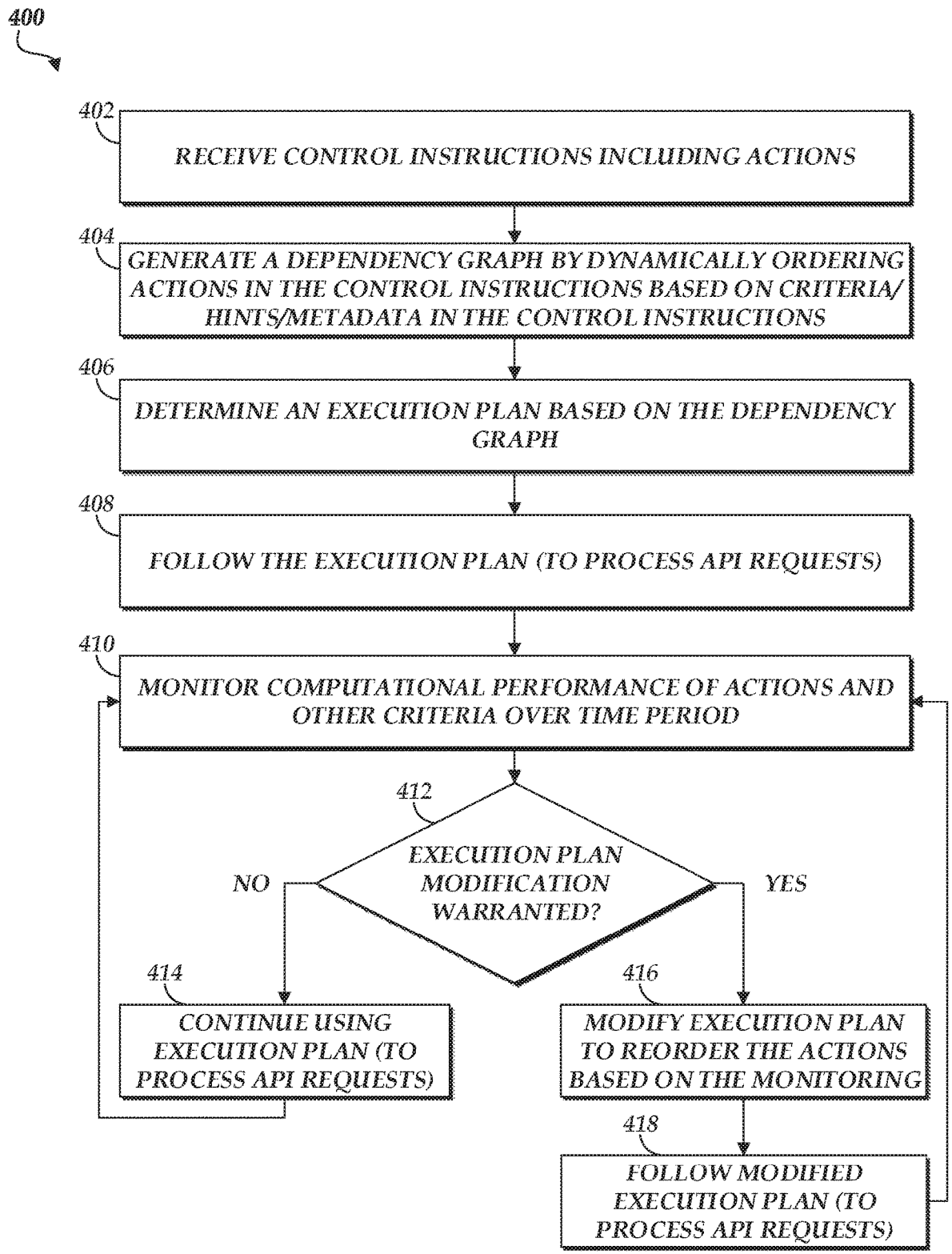
FIG. 4 is a flow chart depicting an example method for dynamically processing API requests.

FIG. 4 is a flow chart depicting an example method for the dynamic processing of API requests. More specifically, FIG. 4 depicts an example method 400 implemented by the API execution service 110 (e.g., of an API execution environment 108) for dynamically processing API requests based on an order of actions considered to be optimal at the time.

At block 402, the API execution service may receive control instructions for an API (which can be stored within an API database). The control instructions may include the API definitions (including implementation details for the API, such as the various types of API requests and their formats, the processing for each type of API request, and the responses to various types of API requests and their formats, any functionality or interactions with various backend services 120 or data storage services) and API configurations, which may specify (or may be used to determine) the set of actions or functionality that are to be performed in processing the various API requests for a particular API. Thus, the control instructions for an API may include or indicate (either directly or indirectly) the entire set of actions or functionality that can be performed in processing the various API requests received by the API execution service 110 for a particular API, and/or a set of actions for processing a particular type API request. The actions may include both internal and external actions, or the actions may include only external actions. In some cases, the API configurations may include customer-provided settings or preferences specifying how certain actions are to be performed (e.g., in series or in parallel) by the API execution service 110. For example, the configuration settings for the API may include customer identifications of actions that should be performed in parallel when processing an API request. Thus, the control instructions received at block 402 may indicate at least a set of actions or functionality that are performed in processing the various types API requests received by the API execution service for a particular API, or alternatively, a set of actions for processing a particular type of API request. The control instructions may also include additional information associated with the set of actions which can be used to determine dependency relationships between the actions in the set of actions and an ordering for how the actions should be performed.

At block 404, the API execution service 110 may generate a dependency graph based on any information available to the API execution service 110, including any information in the control instructions (e.g., API configurations set by the customer) and knowledge inherent to the API execution service (e.g., dependencies associated with internal actions commonly performed by the API execution service 110 for various APIs). Typically, the API execution service 110 may generate the dependency graph by mapping out the dependency relationships between the actions included or indicated in the control instructions (and any other actions used to process the API request, such as internal actions not included in the control instructions) and ordering those actions based on at least those dependency relationships. These dependency relationships may be determined based on criteria, hints, and/or metadata, which are in the control instructions (e.g., in the API definitions or configurations) or associated with the control instructions. The ordering of the actions may be further based on customer-set configurations or preferences for how actions should be performed when processing API requests (e.g., in series or in parallel), which can be evaluated in conjunction with the dependency relationships between the actions. In some cases, these customer-set configurations or preferences may also be determined based on criteria, hints, and/or metadata in the control instructions. Thus, the API execution service 110 may generate the dependency graph by dynamically ordering the set of actions included or indicated in the control instructions, based on the criteria, hints, and/or metadata that are also within the control instructions.

Figure 5:
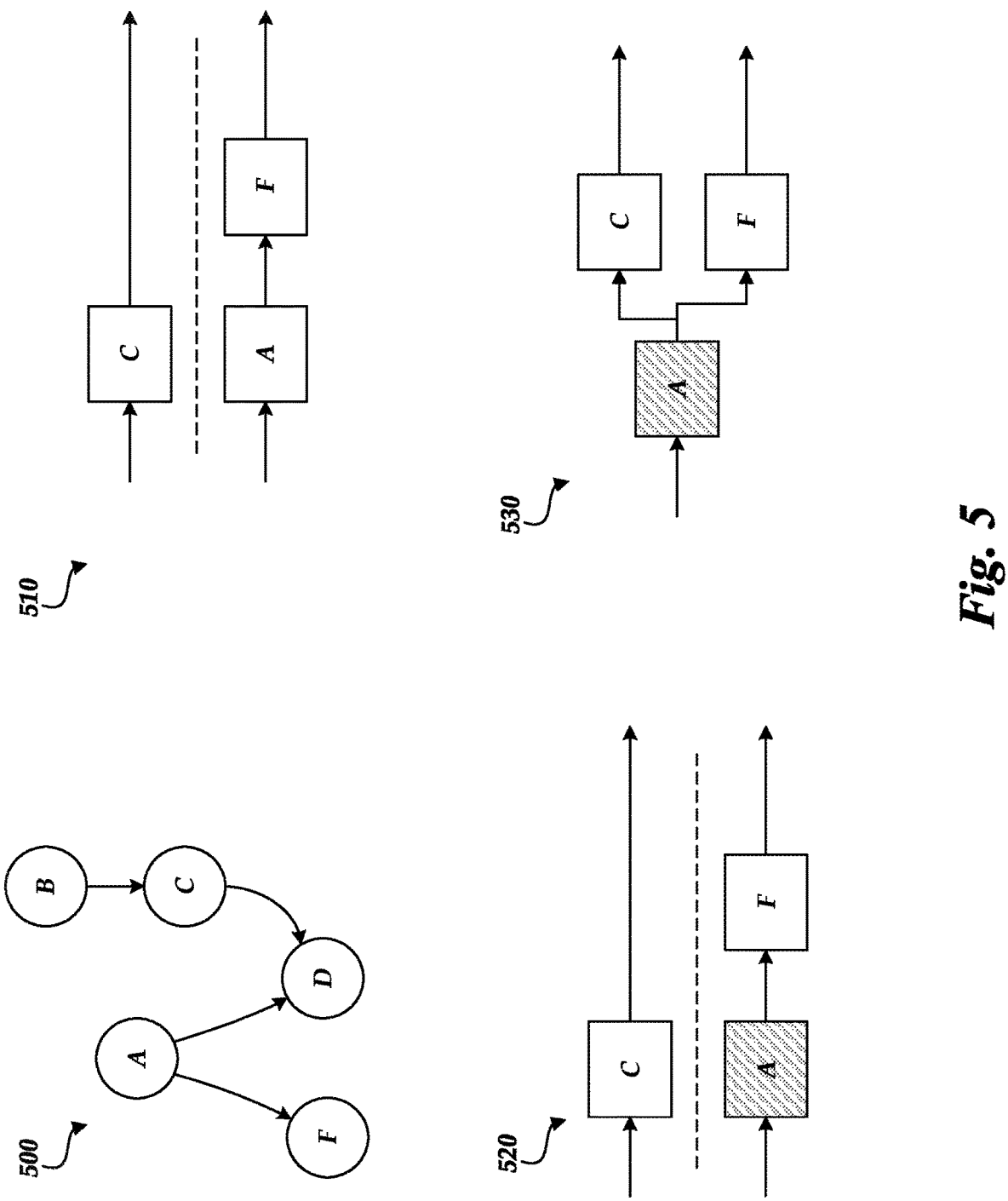
FIG. 5 depicts examples of concepts used in the dynamic processing of API requests.

In some embodiments, the dependency graph may be any suitable data structure or data model that captures the ordering of actions. For instance, in some embodiments, the dependency graph may be a directed acyclic graph that is representative of the actions and their ordering. For instance, each action may be represented by a vertex (e.g., node) in the directed acyclic graph. There can be edges (e.g., lines, arrows, or arcs) between vertices, which connect pairs of vertices in the directed acyclic graph. Each edge can be directed from one vertex to another (e.g., indicating direction), such that the directed acyclic graph provides a topological ordering or sequence for the vertices (e.g., actions in the control instructions). The dependency graph 500 in FIG. 5 is an example of a dependency graph that is a directed acyclic graph. In some embodiments, an actual dependency graph may not be explicitly generated, but the term dependency graph may be additionally understood to refer to this ordering of actions.

The dependency graph may include representations of internal actions (e.g., actions commonly performed by the API execution service 110 for many different APIs, usually associated with features offered by the API execution service 110, such as checks on API requests) and external actions (e.g., actions that are specific to the API and used to execute the business logic or application logic that the customer defined in the API (e.g., backend logic).

In some embodiments, at block 404, the API execution service 110 may parse the control instructions in order to determine dependency relationships associated with performing the set of actions for processing a particular type of API request. This can be done within the context of generating a dependency graph, or it can be done without having to generate a dependency graph, as the determined dependency relationships can be mapped out and directly used to generate or determine an execution plan. Thus, at block 406, an execution plan could be determined based on the dependency relationships, resulting in an execution plan that provides an initial ordered arrangement of a request processing pipeline for performing the set of actions used to process the particular type of API request. This initial ordered arrangement may include two or more actions from the set of actions being performed in parallel. This initial ordered arrangement may change an order for performing the set of actions relative to a default arrangement of a request processing pipeline for performing the set of actions (e.g., based on a default order specified by the customer in the API definitions/configurations, or a default order typically implemented through the API execution service 110). In some cases, this initial ordered arrangement may reduce processing dependencies and/or total processing time associated with performing the set of actions relative to a default arrangement of a request processing pipeline for performing the set of actions (e.g., based on the default order specified by the customer in the API definitions/configurations, or the default order typically implemented through the API execution service 110).

At block 406, the API execution service 110 may determine an execution plan. The initial execution plan may provide an optimal (e.g., in terms of computing resource usage and efficiency) structure or arrangement for a request processing pipeline for processing the received API request, and the execution plan may convey which actions are to be performed serially or in parallel. The execution plan can be generated based on the dependency graph and factor in the dependency relationships between actions that are conveyed by the dependency graph (e.g., actions that are not dependent on other actions can be performed in parallel, whereas actions that have dependencies may be performed after waiting for the prerequisite actions to be completed), which means this initial execution plan will generally mirror the dependency graph. The execution plan 510 in FIG. 5 is an example of an execution plan that mirrors a dependency graph (e.g., the dependency graph 500).

In some embodiments, the initial execution plan may specify an initial arrangement of a request processing pipeline for performing the set of actions for processing a received API request, and this initial arrangement may have two or more actions from the set of actions being performed in parallel. Furthermore, in some embodiments, a dependency graph may not be generated (e.g., skipping performance of step 404), and the API execution service 110 may directly create an execution plan by dynamically ordering the set of actions based on control instructions (e.g., metadata associated with the control instructions) instead of based off a dependency graph.

At block 408, the API execution service 110 may follow the execution plan to process any received API requests that the execution plan is applicable towards. For example, the execution plan may be applicable towards processing API requests of a particular type for the API. Thus, any received API requests for the API that are of that particular type can be processed through a request processing pipeline with the structure and arrangement defined in the execution plan. In some embodiments, the request processor 118 of the API execution service 110 may handle and manage the processing of API requests based on an execution plan.

At block 410, the API execution service 110 may continually monitor the computational performance of the actions involved in processing received API requests over a time period. Monitoring the performance, or the computational performance, of the actions may involve monitoring any relevant aspect associated with performing an action, such as any failures or errors encountered while performing an instance of an action, the failure rates associated with a particular action (e.g., across multiple instances), the amount of computing resource utilization used to perform an instance of an action or the general computing resource utilization associated with the action, and so forth. The API execution service 110 may also continually monitor other criteria over the time period, such as the frequency of failures or failure rate of actions performed, the particular errors associated with action failures, and metrics and logs collected in association with the performance of the actions. The API execution service 110 may continually monitor for any observable, external change in behavior associated with performance of the actions, such as behaviors out of the ordinary (e.g., an action that that is typically completed on average in X minutes or using Y resources requires begins to take substantially more time or resources).

At block 412, the API execution service 110 may assess if modification of the current execution plan in place is warranted. For example, the API execution service 110 may assess if there are potential modifications or improvements that can be made to the execution plan in place, and if the resulting improvements would provide a greater benefit than the cost (e.g., in terms of computing resource utilization) associated with implementing the modifications. In some embodiments, determining whether modification of the execution plan is warranted may involve customer-provided criteria or logic. For instance, there may be customer-provided criterion, such as a cost criterion, which specifies that the execution should not be changed if the modification would result in a cost (e.g., a computing resource cost or utilization, or a monetary cost) that would exceed a certain threshold.

In some cases, in order to assess if modification of the current execution plan is warranted, the API execution service 110 may determine if an execution plan is still ideal or optimal for processing API requests for the API, such as =based on the various techniques and examples described herein. In some embodiments, determining whether the current execution plan is optimal or is not optimal may be additionally based on customer-provided criteria or logic. For instance, there may be customer-provided criterion, such as a cost criterion. For instance, the cost criterion may specify the execution plan is not optimal if following the execution plan to process API requests results in a cost (e.g., a computing resource cost or utilization, or a monetary cost) exceeds a certain threshold.

If the execution plan is still optimal and/or modifications to the execution plan are unwarranted, then at block 414, the API execution service 110 may continue using the existing execution plan to process any API requests that the execution plan is applicable towards, while also looping back to block 410 and continuing to monitor the computational performance of actions and other criteria in order to determine when the execution plan stops being optimal.

On the other hand, if the execution plan is no longer optimal and/or modifications to the execution plan are warranted, then at block 416, the API execution service 110 may modify the execution plan by dynamically reordering the arrangement of actions in the execution plan. This reordering can be based on the information obtained through monitoring (e.g., at block 410). Then, at block 418, the API execution service 110 may use this modified execution plan to process any API requests that it is applicable towards, while also looping back to block 410 and continuing to monitor the computational performance of actions and other criteria in order to determine when this modified execution plan stops being optimal.

FIG. 5 depicts examples of concepts used in the dynamic processing of API requests.

There may be a set of actions or functionality that are performed in processing the various API requests received by the API execution service for a particular API. An action may be dependent on one or more other actions, such as if that action requires the use of data that is output by the one or more other actions, or if performance of that action cannot be initiated until the one or more other actions have been performed. In some embodiments, the API execution service may automatically generate a dependency graph associated with an API. The dependency graph for an API may be generated based on any information available to the API execution service, including information for the API that has been provided to the API execution service (e.g., by the customer). In some of such embodiments, the dependency graph may include internal actions and/or external actions. Internal actions may include actions that are commonly performed by the API execution service (e.g., for many different APIs). External actions may include actions that are specific to the API and used to execute the business logic or application logic that the customer defined in the API (e.g., backend logic). Thus, the generated dependency graph for an API may include actions that are specified for the API (e.g., based on information provided to the API execution service by the customer, such as information in the API definitions or configuration). In some embodiments, a single dependency graph for an API may be associated with the actions or functionality specific to processing a particular type of API request for the API, and there may be multiple dependency graphs—each corresponding to a different type of API request.

In some embodiments, the internal actions that are commonly performed by the API execution service (e.g., for many different APIs) may include various checks performed for a received API request. The internal actions may include a throttling check, an authentication check, an authorization check, and/or a request validation check. In some embodiments, the API execution service may perform a plurality of these internal actions serially (e.g., in a linear sequence), and in other embodiments, the API execution service may perform a plurality of these internal actions in parallel. As described herein, the eventual arrangement and structure of the request processing pipeline that the API execution service follows to perform these internal actions may be captured in an execution plan, which can be largely dependent on the dependency graph generated for the API.

As a specific example, consider a set of actions associated with processing an API request, with the set of actions including actions A, B, C, D, and F. In this scenario, action C may involve calling a backend service C (e.g., one of the backend services 120). However, calling the backend service C may require both data in the API request and data obtained from performance of action B (e.g., data obtained from calling a backend service B). Thus, the backend service C cannot be called until after the backend service B is finished. At the same time, action D may involve calling a backend service D using information obtained from the backend service C and information obtained from performance of action A. Thus, action D may be dependent on both action C and action A. Action F may also use information obtained from performance of action A. Thus, action F may be dependent on action A. However, action A may only involve the use of data in the API request. Similarly, action B may also only involve the use of data in the API request. Since action A and action B both do not have any additional requirements, there are no actions that are prerequisite for the performance of action A or action B. In other words, action A and action B are not dependent on other actions and can be run simultaneously in parallel. These relationships between the actions can be modeled and represented by the dependency graph 500 shown in FIG. 5.

After a dependency graph has been generated for an API, the API execution service can generate one or more execution plans for processing the various types of API requests associated with the API. An execution plan may provide an optimal (e.g., in terms of computing resource usage and efficiency) structure or arrangement for a request processing pipeline for processing a received API request. The execution plan may generated from the dependency graph, which means that the execution plan may initially mirror the dependency graph. However, as described herein, the execution plan may be dynamically modified over time as new information arises that indicates how the execution plan can be adjusted to improve computing resource usage and efficiency.

As a specific example, the API execution service may receive, from a user computing device, an API request for the API associated with the dependency graph 500. In order to process this particular type of API request, the API execution service may have to perform actions A, C, and F. The API execution service can initially generate an execution plan for processing this type of API request based on the dependency graph 500 (e.g., right after ingest of the API or upon the first instance of receiving an API request of this type). This initially generated execution plan should mirror the dependency graph 500 and provide an optimal structure or pipeline for processing this type of API request. In this case, action A and action C can work in parallel. Action F depends on the results of action A and would actually have to run after action A is completed. It is possible that when action F is performed, action C is still being performed. This is acceptable because action F is not dependent on action C. Thus, the API execution service may generate an execution plan that resembles the execution plan 510 shown in FIG. 5, which shows how action C can be performed separately and in parallel to actions A and F, which are performed in a sequential manner.

The API execution service may follow this initially generated execution plan to process any API requests of this type that the API execution service receives for the associated API. However, this execution plan may not remain static. The API execution service may continually monitor the performance of actions in connection with this API and/or continually monitor the performance of actions for each execution plan for this API. In some cases, the data gathered from the monitoring over time may contain some new information (e.g., information not considered during the initial generation of the execution plan) that the API execution service may use to determine that a particular execution plan is not optimal (e.g., it is inefficient with regard to computing resource usage). Upon discovering that an execution plan is not optimal, the API execution service can make dynamic adjustments to the execution plan based on this new information. For example, the API execution service may dynamically reorder the actions performed in the execution plan. The modified execution plan, which should be more efficient than the previous execution plan, can then be used in lieu of the previous execution plan for processing API requests going forward.

For instance, the API execution service may continually monitor the performance of actions A, C, and F when those actions are performed (e.g., by components or nodes of the API execution service 110 and/or API execution environment 108) to process API requests in accordance with the execution plan 510. In a hypothetical scenario, the API execution service may determine, from monitoring the performance of action A in connection with the execution plan 510, that action A always or frequently fails. Given the structure of the execution plan 510, if action A is always or frequently failing, then computing resources are being wasted because they are being utilized more than they should be. More specifically, if action A is always or frequently failing, there is no point in performing the work for action C, which is run in parallel to action A. This scenario is conceptually represented by the execution plan 520, which is similar to the execution plan 510 but has additional shading for action A to indicate its high failure rate. Every time that action A fails, all the computing resources that had been invested in performing action C up to that point in time were essentially wasted.

To resolve this, the API execution service may dynamically adjust the execution plan to reflect what it now considers to be the optimal arrangement for the request processing pipeline (at least, until new information is obtained that would necessitate further updates to be made to the arrangement of the request processing pipeline). In other words, the API execution service may reorder the actions in the execution plan to improve computing resource usage and efficiency. The API execution service may be constantly modifying or adjusting execution plans in a dynamic way, based on any new developments or observations that the API execution service learns about the execution plans (e.g., from monitoring the performance of the actions in the execution plans). For instance, the API execution service may observe that a certain action of an execution plan is always failing, recognize that the execution plan may no longer be optimal, and modify the execution plan based on what is dynamically happening (e.g. by making any actions that are performed in parallel to the failing action dependent on the failing action).

In the provided example, the API execution service may move action A in front of both action C and action F (e.g., make both action C and action F dependent on action A). The modified execution plan may resemble the execution plan 530 shown in FIG. 5, which shows how action C is now dependent on the performance of action A (despite there being no such relationship in the dependency graph 500). This would prevent the performance of action C (and thus, allocation of computing resources towards action C) unless it was one of those rare instances in which action A succeeded. This modified execution plan may be used for processing these types of API requests until new information arises that allows for a better execution plan (e.g., for example, the API execution service determines a collection of parameters that would indicate in advance that performance of action A will be successful).

It should be noted that, that the various aspects of the systems, methods, and techniques described herein (including the discussions with respect to the various embodiments of the API execution service and/or the API execution environment) can be applicable to any other software-based request processing environment. For instance, they are applicable to any software-based execution environment which performs a set of actions in an ordered manner. As a more specific example, there may be a software-based process request pipeline, which can be associated with a set of actions. The set of actions may be performed based on an ordering determined by the software-based request processing environment (or a component of the software-based request processing environment). The ordering can be determined from a dependency graph or dependency relationships generated from a definition of the set of actions. In some cases, the definition can be customer-defined or include customer preferences or criteria and can be provided to the software-based request processing environment.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    receiving control instructions for an API, wherein the control instructions comprise a set of actions associated with the API;
    generating a dependency graph that maps out dependencies among the set of actions by:
        determining one or more dependency relationships among the set of actions based on at least metadata associated with the control instructions; and
        ordering the set of actions based on at least the one or more dependency relationships;
    determining an execution plan based on at least the dependency graph, wherein the execution plan specifies an initial arrangement of a request processing pipeline for performing the set of actions, wherein the initial arrangement reflects the one or more dependency relationships among the set of actions;
    receiving, from a user computing device, an API request for the API;
    processing the API request by performing the set of actions in accordance with the execution plan;
    monitoring performance of the set of actions associated with the API over a period of time;
    determining a modification to the execution plan is warranted based on at least the monitoring;
    dynamically modifying the execution plan based on at least the monitoring, wherein the modified execution plan specifies a rearrangement of the request processing pipeline for performing the set of actions, wherein the rearrangement reflects an ordering of a relationship between two or more actions of the set of actions that is different from that reflected by the one or more dependency relationships; and
    processing an additional API request for the API by performing the set of actions in accordance with the modified execution plan.

2. The computer-implemented method of claim 1, wherein determining the modification to the execution plan is warranted comprises identifying that performance of an action in the set of actions is associated with a failure rate above a failure threshold.

3. The computer-implemented method of claim 2, wherein dynamically modifying the execution plan comprises reordering the performance of the action to take place earlier in the request processing pipeline.

4. The computer-implemented method of claim 2, wherein determining the modification to the execution plan is warranted is further based on a customer-provided criterion.

5. The computer implemented method of claim 1, wherein determining the modification to the execution plan is warranted is further based on applying a configurable set of logic to data obtained by monitoring performance of the set of actions over the period of time.

6. A computing system comprising:
    a data storage medium; and
    one or more computer hardware processors in communication with the data storage medium, the one or more computer hardware processors configured to execute computer-executable instructions to at least:
        receive control instructions for an API, wherein the control instructions comprise a set of actions associated with the API;
        determine, from the control instructions, one or more dependency relationships among the set of actions;
        determine an execution plan based on at least the one or more dependency relationships, wherein the execution plan specifies an initial arrangement of a request processing pipeline for performing the set of actions, wherein the initial arrangement reflects the one or more dependency relationships among the set of actions;
        receive, from a user computing device, an API request for the API;
        process the API request by performing the set of actions in accordance with the execution plan;
        monitor performance of the set of actions associated with the API over a period of time;
        determine the execution plan is not optimal based on at least the monitoring; and
        modify the execution plan based on at least the monitoring, wherein the modified execution plan specifies a rearrangement of the request processing pipeline for performing the set of actions, wherein the rearrangement reflects an ordering of a relationship between two or more actions of the set of actions that is different from that reflected by the one or more dependency relationships.

7. The computing system of claim 6, wherein the one or more computer hardware processors are further configured to execute computer-executable instructions to at least:

process an additional API request for the API by performing the set of actions in accordance with the modified execution plan.

8. The computing system of claim 6, wherein determining the execution plan is not optimal comprises identifying that performance of an action in the set of actions is associated with a failure rate above a failure threshold.

9. The computing system of claim 8, wherein modifying the execution plan comprises reordering the performance of the action to take place earlier in the request processing pipeline.

10. The computing system of claim 9, wherein determining the execution plan is not optimal is further based on applying a configurable set of logic to data obtained by monitoring performance of the set of actions over the period of time.

11. The computing system of claim 6, wherein determining the execution plan is not optimal is further based on a customer-provided criterion.

12. The computing system of claim 11, wherein the customer-provided criterion is a cost criterion.

13. Non-transitory computer-readable media including computer-executable instructions that, when executed by a computing system, cause the computing system to perform operations comprising:
receiving a definition for a software-based process request pipeline, wherein the definition identifies a set of actions associated with the software-based process request pipeline;
parsing the definition to determine dependency relationships among the set of actions, wherein the dependency relationships are associated with performing the set of actions;
dynamically determining an execution plan based on at least the dependency relationships, wherein the execution plan specifies an initial ordered arrangement for performing the set of actions, wherein the initial ordered arrangement reflects the dependency relationships among the set of actions;
receiving a request to perform the software-based process request pipeline;
performing the set of actions in accordance with the execution plan;
monitoring performance of the set of actions over a period of time;
dynamically modifying the execution plan based on at least the monitoring, wherein the modified execution plan specifies a reordered arrangement for performing the set of actions, wherein the reordered arrangement reflects an ordering of a relationship between two or more actions of the set of actions that is different from that reflected by the dependency relationships; and
processing an additional request by performing the set of actions in accordance with the modified execution plan.

14. The non-transitory computer-readable media of claim 13, wherein the initial ordered arrangement reduces processing time for performing the set of actions relative to a default ordered arrangement for performing the set of actions.

15. The non-transitory computer-readable media of claim 13, wherein the initial ordered arrangement changes an order for performing the set of actions relative to a default ordered arrangement for performing the set of actions.

16. The non-transitory computer-readable media of claim 13, wherein the initial ordered arrangement comprises two or more actions from the set of actions being performed in parallel.

17. The non-transitory computer-readable media of claim 13, wherein the initial ordered arrangement reduces processing dependencies associated with performing the set of actions relative to a default ordered arrangement for performing the set of actions.

18. The non-transitory computer-readable media of claim 13, wherein the computer-executable instructions, when executed by the computing system, further cause the computing system to perform operations comprising:
determining, from among the set of actions, a first action failed based at least on the monitoring, wherein dynamically modifying the execution further comprises:
determining the reordered arrangement such that performing another action from among the set of actions is dependent upon the first action completing.

19. The non-transitory computer-readable media of claim 18, wherein dynamically modifying the execution plan is further based at least on one or more criterion, wherein the one or more criterion comprise a network performance criterion.

20. The non-transitory computer-readable media of claim 18, wherein dynamically modifying the execution plan is further based at least on one or more criterion, wherein the one or more criterion comprise a criterion provided by a customer defining the definition.

* * * * *